(12) United States Patent
Hosokawa et al.

(10) Patent No.: US 7,606,633 B2
(45) Date of Patent: Oct. 20, 2009

(54) ROBOT SIMULATION DEVICE, AND ROBOT SIMULATION PROGRAM

(75) Inventors: Hirofumi Hosokawa, Hiroshima (JP); Seiichi Fujii, Hiroshima (JP)

(73) Assignee: Rorze Corporation (JP)

( * ) Notice: Subject to any disclaimer, the term of this patent is extended or adjusted under 35 U.S.C. 154(b) by 636 days.

(21) Appl. No.: 10/550,285

(22) PCT Filed: Mar. 25, 2003

(86) PCT No.: PCT/JP03/03583

§ 371 (c)(1),
(2), (4) Date: Sep. 22, 2005

(87) PCT Pub. No.: WO2004/085120

PCT Pub. Date: Oct. 7, 2004

(65) Prior Publication Data
US 2006/0184275 A1    Aug. 17, 2006

(51) Int. Cl.
*G06F 19/00*    (2006.01)
(52) U.S. Cl. .................... 700/245; 700/231; 700/249; 700/258; 700/260; 700/261; 318/568.11; 318/568.21; 606/130; 606/139; 606/205; 709/208; 709/217; 901/1; 901/2; 901/6; 901/30; 901/33; 600/102
(58) Field of Classification Search ................ 700/245, 700/231, 249, 258, 260, 261, 262, 263; 318/568.11, 318/568.21; 606/130, 139, 205; 901/1, 2, 901/6, 30, 33, 34; 600/102; 709/208, 217
See application file for complete search history.

(56) References Cited

U.S. PATENT DOCUMENTS

| | | | | |
|---|---|---|---|---|
| 5,530,791 | A | 6/1996 | Okabayashi | |
| 5,844,392 | A * | 12/1998 | Peurach et al. | 318/568.17 |
| 6,028,593 | A * | 2/2000 | Rosenberg et al. | 345/156 |
| 6,140,788 | A * | 10/2000 | Watanabe et al. | 318/568.22 |
| 6,281,651 | B1 * | 8/2001 | Haanpaa et al. | 318/568.11 |
| 6,328,523 | B1 * | 12/2001 | Watanabe et al. | 414/416.01 |
| 6,356,806 | B1 * | 3/2002 | Grob et al. | 700/245 |

(Continued)

FOREIGN PATENT DOCUMENTS

JP    1-92808    4/1989

(Continued)

OTHER PUBLICATIONS

Chen et al. Simulation and animation of sensor-driven robots, 1994, IEEE, p. 684-704.*

(Continued)

*Primary Examiner*—Khoi Tran
*Assistant Examiner*—McDieunel Marc
(74) *Attorney, Agent, or Firm*—Cantor Colburn LLP

(57) ABSTRACT

A robot simulation device is provided. It includes a virtual robot working environment in which a virtual robot has a task of transferring a virtual object from a start point to a goal point, the simulation device determining the path of travel. A task simulation is executed in response to the virtual robot working environment and the path of travel. The task simulation determines a robot activity region where the virtual robot can operate and an interference region where the virtual robot encounters obstacles. Thereafter the device creates a desired executed simulation in which the virtual robot can operate without encountering obstacles.

20 Claims, 9 Drawing Sheets

U.S. PATENT DOCUMENTS

| | | | |
|---|---|---|---|
| 6,853,964 B1 * | 2/2005 | Rockwood et al. | 703/2 |
| 6,912,449 B2 * | 6/2005 | Sabe et al. | 700/259 |
| 7,046,765 B2 * | 5/2006 | Wong et al. | 378/117 |
| 7,103,145 B2 * | 9/2006 | Wong et al. | 378/117 |
| 7,206,626 B2 * | 4/2007 | Quaid, III | 600/407 |
| 7,211,978 B2 * | 5/2007 | Chang et al. | 318/568.11 |
| 2001/0025221 A1 * | 9/2001 | Klein | 701/209 |
| 2005/0096136 A1 * | 5/2005 | Ohta | 463/43 |

FOREIGN PATENT DOCUMENTS

| | | |
|---|---|---|
| JP | 1-92808 A | 4/1989 |
| JP | 5-131385 | 5/1993 |
| JP | 5-131385 A | 5/1993 |
| JP | 5-224734 | 9/1993 |
| JP | 5-233052 | 9/1993 |
| JP | 5-233052 A | 9/1993 |
| JP | 7-78017 | 3/1995 |
| JP | 7-78017 A | 3/1995 |
| JP | 7-141016 | 6/1995 |
| JP | 8-194512 | 7/1996 |
| JP | 8-194512 A | 7/1996 |
| JP | 10-260714 | 9/1998 |
| JP | 10-260714 A | 9/1998 |
| JP | 11-259112 | 9/1999 |
| JP | 2000-94131 | 4/2000 |
| JP | 2002-299405 | 10/2002 |
| JP | 2002-299405 A | 10/2002 |
| JP | 2002-361580 A | 12/2002 |

OTHER PUBLICATIONS

International Search Report for International Application No. PCT/JP03/03583 dated Jul. 1, 2003.

Japanese Office Action for Japanese Patent Application No. 2004-569923 mailed Mar. 24, 2009 with English translation.

Korean Office Action for Korean Application No. 10-2005-7015833 dated May 21, 2009 with English translation.

* cited by examiner

Fig. 4

8 display coordinates
display a robot (shape & location)
display a finger (shape & location)
display time
route generation & route modification
obstacles region generation,
    and modification
screen expanding, shrinking,
    and shifting
coordinate axes (X, Y, Z) shifting
rotation & copy
distance between vertexes
data input
inversion input

ROBOT SIMULATION DEVICE, AND ROBOT SIMULATION PROGRAM

BACKGROUND OF THE INVENTION

1. Field of the Invention

The present invention relates to a computer simulation device and simulation programs, when an object is transferred by a robot such as a carrier machine, by which if there exists position interference between the object and ambient surroundings or not, is examined in advance.

For more detail, the present invention relates to transferred objects such as a semiconductor material, a liquid crystal display panel, a plasma display panel, an organic light emitting display panel, an inorganic light emitting display panel, a field emitting display panel and it's sheet like base plate.

And the present invention relates to a SCARA ("Selective Compliant Assembly Robot Arm" or "Selective Compliant Articulated Robot Arm") type robot, and to a simulation device which simulates a path of the moving robot itself and a moving sheet like object, when the robot transfers the sheet like object, and relates to the device which generates programs teaching a transferring operation to the robot.

2. Related Art

A robot simulation device in which both a location of a robot and an arm position are displayed on a working space window, is disclosed in "JP 05-224734". This device is suitable for a simulation where a surrounding condition is given. In "JP 07-141016", a simulation device which generates most relevant teaching data for a playback robot is disclosed. And in "JP 11-259112", a device which checks if there is interference between a moving robot and it's surroundings is disclosed.

But a large-scale computer is used in the existing simulation devices, and as there is no way to visually check an interference condition on a display, it was difficult to select and design an appropriate working space and dimensions of a robot.

Consequently, an objective of the present invention is to provide a simulation device on a small personal computer, which makes it possible selecting a suitable size of a robot when a certain size of a working space is given, and selecting a suitable size of a working space and other specifications when a robot's size and functions are given.

DISCLOSURE OF THE INVENTION

A first embodiment of a robot simulation device is a robot simulation device, comprising of an input device, a display, a central computer, computing programs, an output device of teaching programs, and following means to simulate whether the robot can transfer an object in a working space where obstacles are located, without any interference in the working space:

(1) a two-dimensional display having coordinate axes,
(2) a means to display the obstacles, the working space, a moving robot and the object transferred by the robot, on the display,
(3) a means to interpolate a path by designating path points of a central point of the moving object,
(4) a means to display a path wherein the object is moved in the working space, and
(5) a means to display an interference region of the path and the obstacles.

Above-mentioned simulation device has effects that it makes it possible to examine with eyes on a display of a small personal computer by simple operations, if a selected robot can carry out a specified work properly in given working space, without having any interference with surroundings.

A second embodiment of the robot simulation device is a robot simulation device, further comprising:

a means of measuring and displaying traveling time of the object and the robot, and a means of displaying a moving picture of the path of the moving object and movable portion of the robot.

As the path of the moving robot can be verified by the moving picture on a two-dimensional display, the device has effects that preferable working space or preferable specifications of the robot can be selected.

A third embodiment of the robot simulation device is a robot simulation device, further comprising, a means of calculating traveling speed of the object and the movable portion of the robot.

In this device, it is possible to measure a traveling time and speed of the transferred object, and traveling speed of the robot, so the device has effects that it is easily judged if a stepping out of the robot occurs, and modification of robot's specification is available.

A forth embodiment of the robot simulation device is a robot simulation device wherein the two-dimensional display displays a horizontal plane or a vertical plane of the working space.

The simulation device has effects that it makes it possible to compare the interference region on the display and design drawings with eyes, by displaying at first an interference region of the robot on a plane view (X-Y axes plane) of a working space, and further displaying the interference region on vertical views (X-Z axes plane, Y-Z axes plane).

A fifth embodiment of the robot simulation device is a robot simulation device wherein the obstacles and the working space are displayed by a polygonal form and/or a circular form.

In this device, obstacles and a working space can be displayed by a simple polygonal form or a circular form, the device has effects that not only the operation is easy but also detecting an interference region is easily done. Above-mentioned polygonal form can be selected among from a triangle to a 64-gon, as far as each side of the form does not intersect with each other, any plane figure is available. A size of the polygonal form is selected arbitrarily. A circular form can be drawn by designation of a center position and a radius. And combination of a polygonal form and a circular form is also available to specify the region.

A sixth embodiment of the robot simulation device is a robot simulation device wherein the path of the moving object is calculated by designating a departure point and a destination point of the robot.

As the device automatically calculates a path of the moving transferred object, by designating a position of the robot on the basis of an original point, the device has effects that a most appropriate position of the robot and working space are easily determined.

A seventh embodiment of the robot simulation device is a robot simulation device wherein a route and the path of the moving object is further calculated by designating a departure point and a plurality of destination points of the object on the display.

As a successive path of the moving transferred object can be checked on a display, setting an adequate alignment of the robot, a processing equipment of various base plates and the working space can be easily achieved.

A eighth embodiment of the robot simulation device is a robot simulation device wherein a region where the robot is unable to transfer the object is calculated and displayed by designating a boundary of a movable region of the robot on the display.

The device has effects that the working space can be modified if it is necessary. The boundary of a movable region is decided by, for example, a constraint of an arm joint of a robot, a mechanical stopper installed at a rotating part of a robot body, a constraint of a moving range of an arm which is moved by a parallel linkage, and a constraint of a moving range by a belt and a pulley.

A ninth embodiment of the robot simulation device is a robot simulation device, wherein the output device outputs at least dimensions of the robot, the path of the moving robot, the speed of the robot according to data which is achieved by a simulation.

As above-mentioned simulation device displays a teaching data beforehand of a real operation with which the robot is to be operated, it is possible to judge if the data is an appropriate one or not.

A tenth embodiment of the robot simulation device is a robot simulation device wherein the simulation device further teaches a motion of movable part of the robot.

As the device generates a moving plan of a movable part of the robot, specifically the robot's arm, after checked with eyes that there is no interference region, the result of the moving plan can be taught to a real robot beforehand of the real movements.

An eleventh embodiment of the robot simulation device is a robot simulation device wherein the robot is a SCARA type robot and the object is a sheet like base plate.

As a SCARA robot is commonly used, of which an arm carries an object on a planar motion, the device has effects that the robot can be applied to, for example, transferring a semiconductor base plate (a wafer), a grass plate for a flat panel display and so forth.

A twelfth embodiment of the robot simulation device is a program which depicts a data achieved on the basis of the simulation by the device on said display, and/or makes a real robot perform the transferring works.

Above-mentioned program depicts a confirmed simulation work by the robot simulation device on the display, and makes the real robot perform the transferring works. The program has effects that it makes the real robot perform the work which is confirmed beforehand.

BRIEF DESCRIPTION OF THE DRAWINGS

FIG. 4 is a list of major software elements of a simulation device of the present invention;

DETAILED DESCRIPTION OF THE PREFERRED EMBODIMENTS

With reference to the drawings, embodiments of the present invention will be explained below. But the present invention is not limited to these embodiments, and a robot simulation device can teach motions of a robot in similar surroundings.

As an example, following robot simulation device is explained. A robot located in a transferring room takes out a wafer from wafer cassettes which are disposed around the transferring room. The robot transfers the wafer to a load lock chamber which is connected to a processing room. And the robot puts back the wafer to the wafer cassette after it is processed. The robot simulation device simulates above-mentioned work of the robot.

Figure 1:
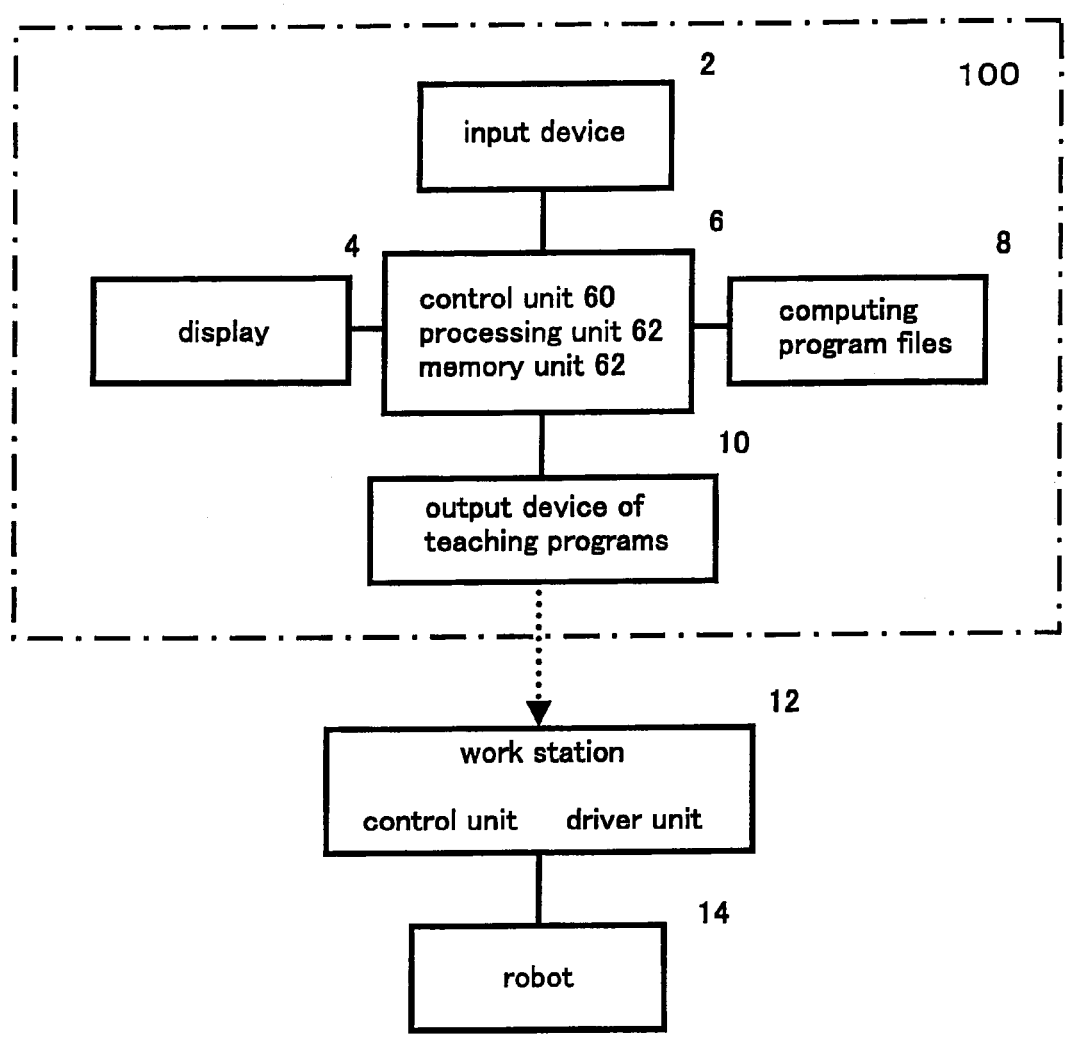
FIG. 1 is a skeleton diagram showing entire structure of a simulation system of the present invention.

FIG. 1 shows a configuration of a simulation device 100 of the present invention. The robot simulation device comprises of an input device 2 by which a setting of a working space, a specification of a robot (dimensions, shapes, etc.) and working conditions are inputted, and a central computer 6 which comprises of a control unit 60, a processing unit 62, a memory unit 64. As the central computer 6, for example, a personal computer which comprises of Windows 2000 as an operating system or a host computer are available.

The robot simulation device of the present invention requires a size and a shape of a movable part of the robot as input data, and with these data the device calculates a path etc., but the device can be a sole use simulation device in which these data are inputted in advance.

As the operating system, Windows, Macintosh, Linux, etc. are also available. However, it is highly preferred that the OS is the Windows 2000 or greater, or the Mac OS version 8.5 or greater.

A well-known language as Assembler, COBOL, and other compiler language such as C, Visual Basic and so forth are available for the robot simulation device of the present invention. Especially C is highly preferred because it matches with the Windows and the Mac OS.

A display 4 which displays a result of a calculation and a computer program file 8 which executes a simulation are connected to the central computer. The computer program file 8 can be an independent file or stored in a memory unit 64.

An output device of teaching programs 10, which outputs a result of the calculation and teaches it to a real robot, is further connected to the central computer 6.

The outputted teaching program is used in a work station 12 via an appropriate a storage media and by the program, the workstation makes a robot to perform given tasks. The teaching program can be directly sent to the workstation 12.

Figure 2:
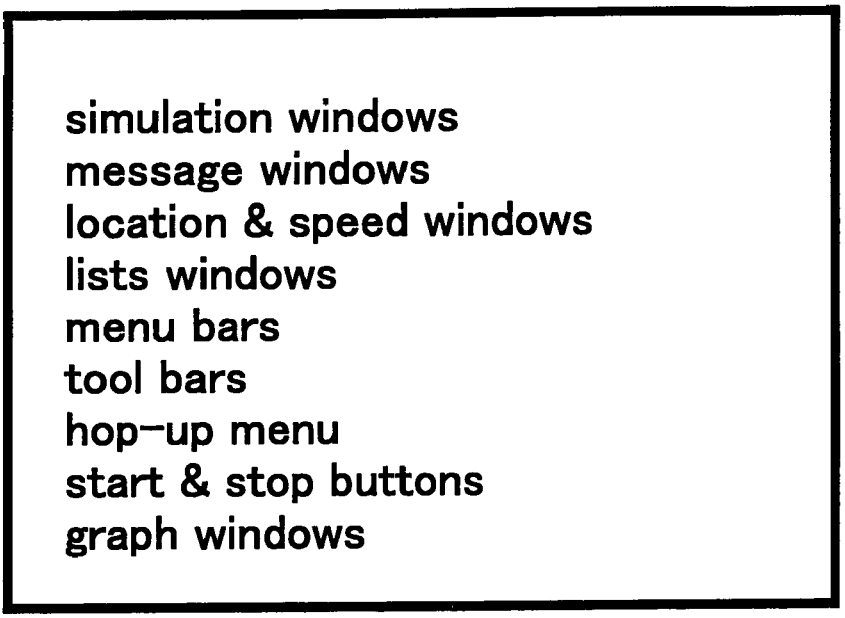
FIG. 2 shows items of which the simulation system of the present invention displays on a display.
Figure 3:
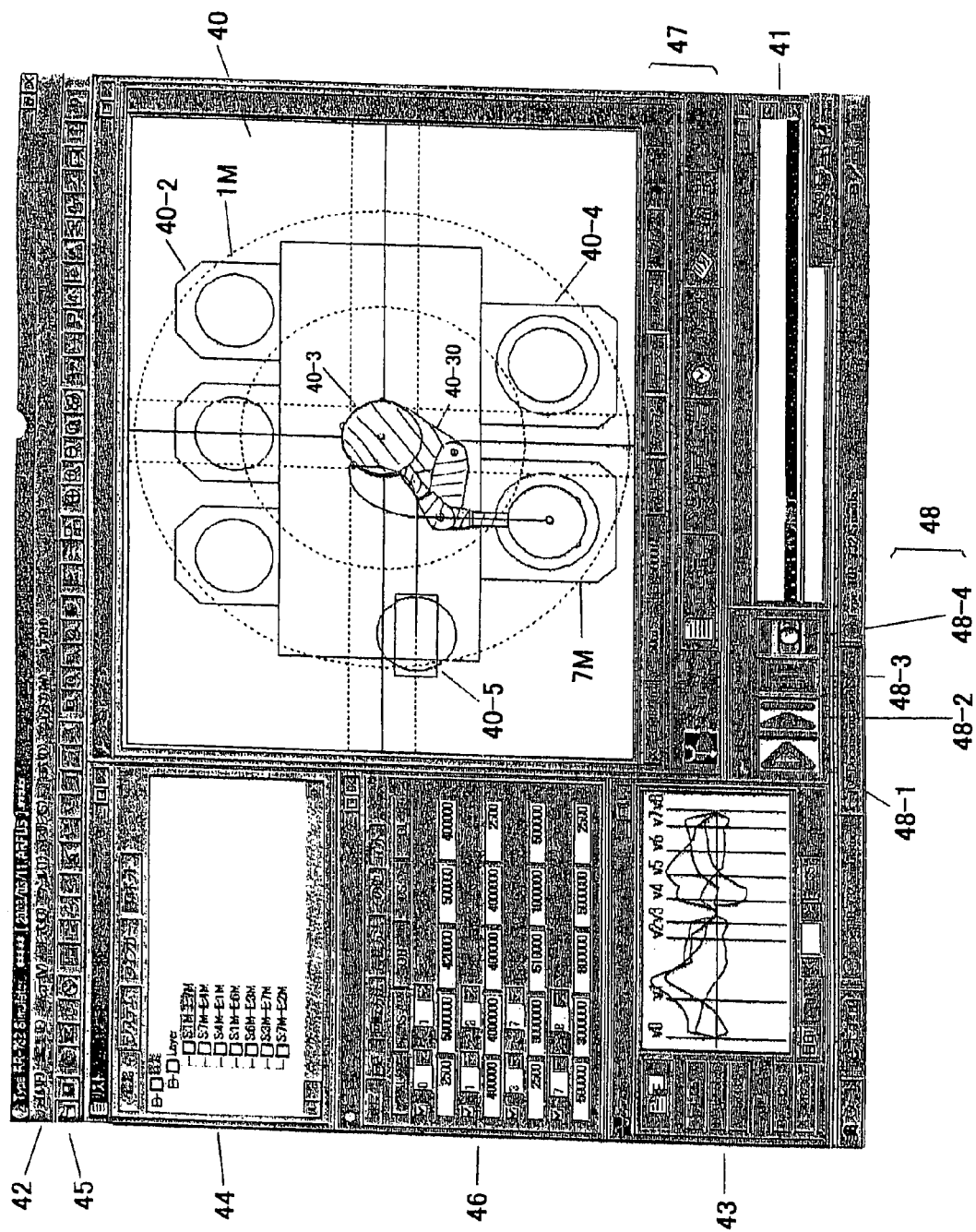
FIG. 3 is a representative example screen of the present invention, displayed on the display.

Elements displayed on a display 4 are shown as a list in FIG. 2 and specific display screen is shown in FIG. 3. Major screen elements of the display are, a path of an moving transferred object, a layout of the device, a robot simulation window 40 by which dimensions of the robot's arm are inputted, a message window 41 which shows contents of calculation (events), a speed information window 46, a list window 44 of programs which concern to a wafer transferring path, a toolbar 45 by which various commands are inputted, a menu bar 42, a popup menu which is not drawn, a start and a stop buttons 48 and various editing program buttons 47 etc.

Concerning FIG. 3, further explanation is as follows. At first, a working region 40-1 as a transferring room is defined in the simulation window 40 by X-Y coordinate axes. Next, a robot 40-3 is defined in the window. The robot is a 4-axe SCARA robot. And three wafer cassettes 40-2 which house wafers, and two intermediate boxes 40-4 by which the wafer is transferred to a processing room, are defined as obstacles.

Bottom part of FIG. 3 connects to a wafer processing room via a load lock room. The 4-axe robot provides a positioning device 40-5 by which a center position and direction of a wafer 40-3 held by an arm (a finger) 40-30 is modified. The working space 40-1, the arm of the robot, and so forth are defined by its position (X, Y) in X-Y coordinate axes. When the arm of the robot moves, the position (X, Y) of the arm is defined.

Above-mentioned working space (here the space is defined in a horizontal plane 40-1), the robot's finger, a kind of the robot, and so on are set by selecting commands which correspond to a tool bar 45. Next, a route 44-2 which is to be simulated is selected. For example, if S1M-E7M is selected, a route to transfer a wafer from a cassette 1M to 7M is selected.

Next, a speed (μm/sec) of a 4-axe arthro and a center position of the wafer, a direction of a rotation, a manner of a rotation, a manner of standby and so forth are set by an information window 46. A start and a stop buttons 48 are buttons by which various commands are executed.

Various commands 47 by which the simulation editing is done are located below a simulation window 40. For example, a grid is a button by which a coordinate grid is displayed.

By clicking a time chart button, measuring a moving time of the robot's finger is triggered. A start and a stop buttons 48 comprise of a continuous movement of the robot's arm button 48-1 (far left), frame by frame movement of the arm button 48-2 (second from left), an interference region display button 48-3 (third from left) and so on. A message window 48 comprises of a start button and a stop buttons by which the simulation is started or stopped, and so on.

When the simulation is started, a moving speed at each path points which are set in advance (V0-V9, not drawn) is shown on the display in real time. As lines which connect the path points have angles, the lines are automatically adjusted by a circular arc so that the finger of the robot moves smoothly. By a speed display of a graph window 43, a step-out condition of a motion of the robot can be judged. Other data such as moving time, a maximum speed, and so forth of the finger are also displayed. These moving time and speed of the finger are calculated on the basis of variation of given positions (X, Y) in X-Y coordinate axes.

In FIG. 4, further major function elements of a simulation program are listed, which are explained referring FIG. 3. That is, following functions are provided:

a displaying a coordinate grid function, a displaying a robot function, a displaying a finger function, a displaying time function, a route finding function, a drawing an obstacle region function, a scaling a display function, a shifting a display function, a setting coordinate axes function, a shifting and a rotating a display function, a copy function, a setting distance between vertexes function, an inputting numeric value function, an inputting original point function, and so on.

By using above-mentioned functions, steps how to simulate the robot's work is explained in what follows. Referring FIG. 5, steps of setting a working space of the robot in a simulation window 40 are explained. This process is also available in designing a wafer transferring room.

Figure 5:
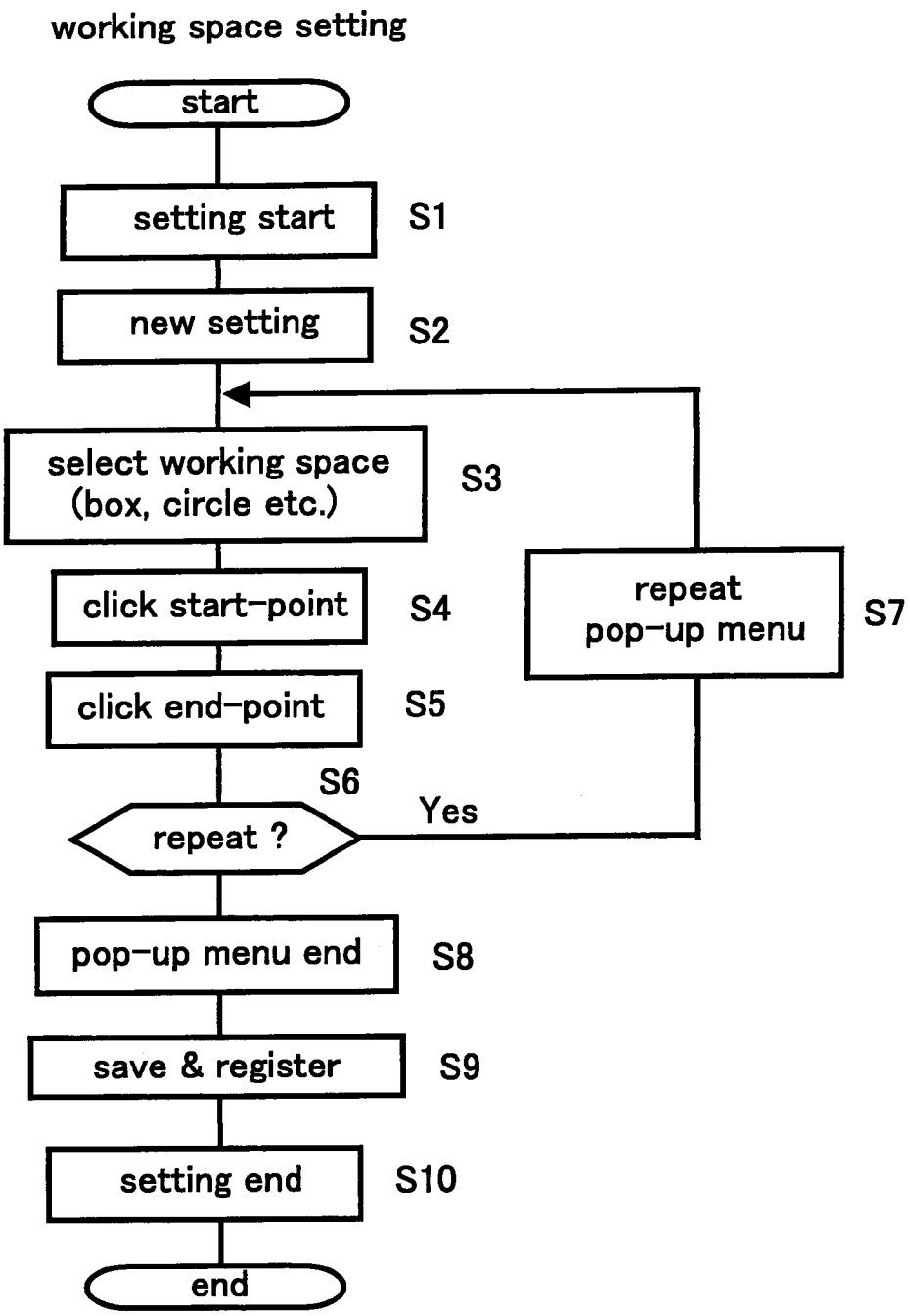
FIG. 5 shows a setting process of a working region of a robot in a simulation process.

In a setting start step (S1) in the FIG. 5, a file button of a menu bar 42 is clicked. And next is a new setting step (S2). And one of working spaces listed in a list window 44 (a box, a circle, etc.) is selected (S3). And a start point of a box (a corner) is clicked by a mouse (S4) and end point of the box (a diagonal corner) is clicked (S5) so that the box shape is defined in a simulation window display 40 and this working space is inputted into the system. If a circle is selected, then a center position of the circle and a radius of the circle are defined by a mouse clicking (S4, S5).

Dimensions of the inputted working space are automatically converted by a scale which is set beforehand. If the setting of the working space is not appropriate the inputted working space is canceled by pushing a right button of the mouse.

If the setting is appropriate, then the process is terminated by a pop-up menu (S8), and the set data is saved and registered in the system (S9) and setting the working space process is concluded (S10). This working space is defined by position (X, Y) in X-Y coordinate axes. This defining way of positions is also applied in following processes.

Figure 6:
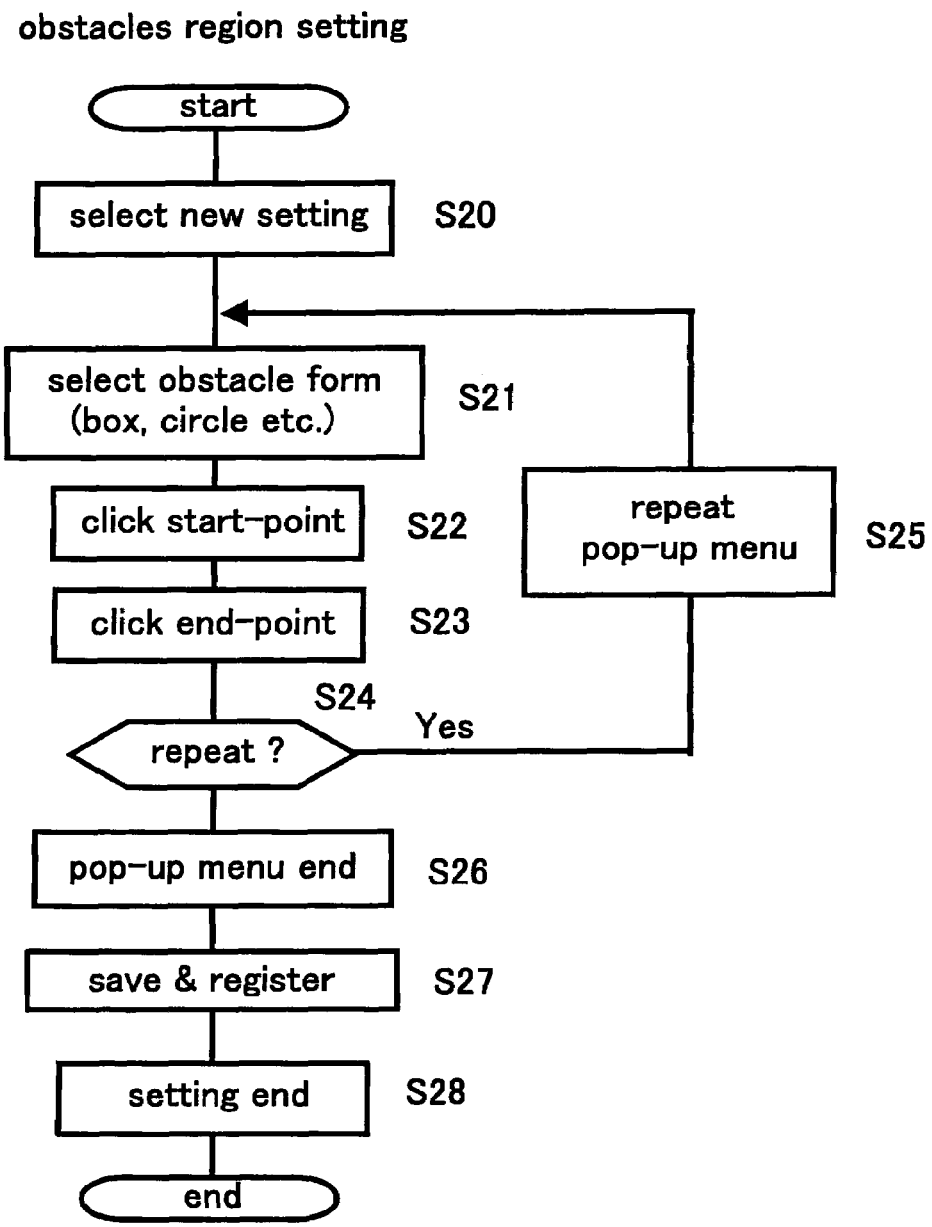
FIG. 6 shows a setting process of an obstacle in the simulation process.

Next, setting an obstacle region process is shown in FIG. 6. This process is to define positions of wafer boxes (cassettes) 40-2 which are disposed around a pre-chamber (a working space) 40-1 and to define a position of a load lock room 40-4 where a wafer is processed.

At first, a file button of a menu bar 42 is clicked, next a new file in a menu is selected (S20), and a shape (a box, a circle) of an obstacle is selected (S21). Same as the steps in FIG. 5, by clicking a corner and a diagonal corner of a box, a shape of the obstacle is defined (S22, S23). If it is necessary, the steps are repeated (S24, S25). If the definition of the shapes is not appropriate, the definition is canceled. If the definition is appropriate then the procedure is finished (S26) and the definition is saved and registered in the system (S27) and the setting process is finished (S28).

Figure 7:
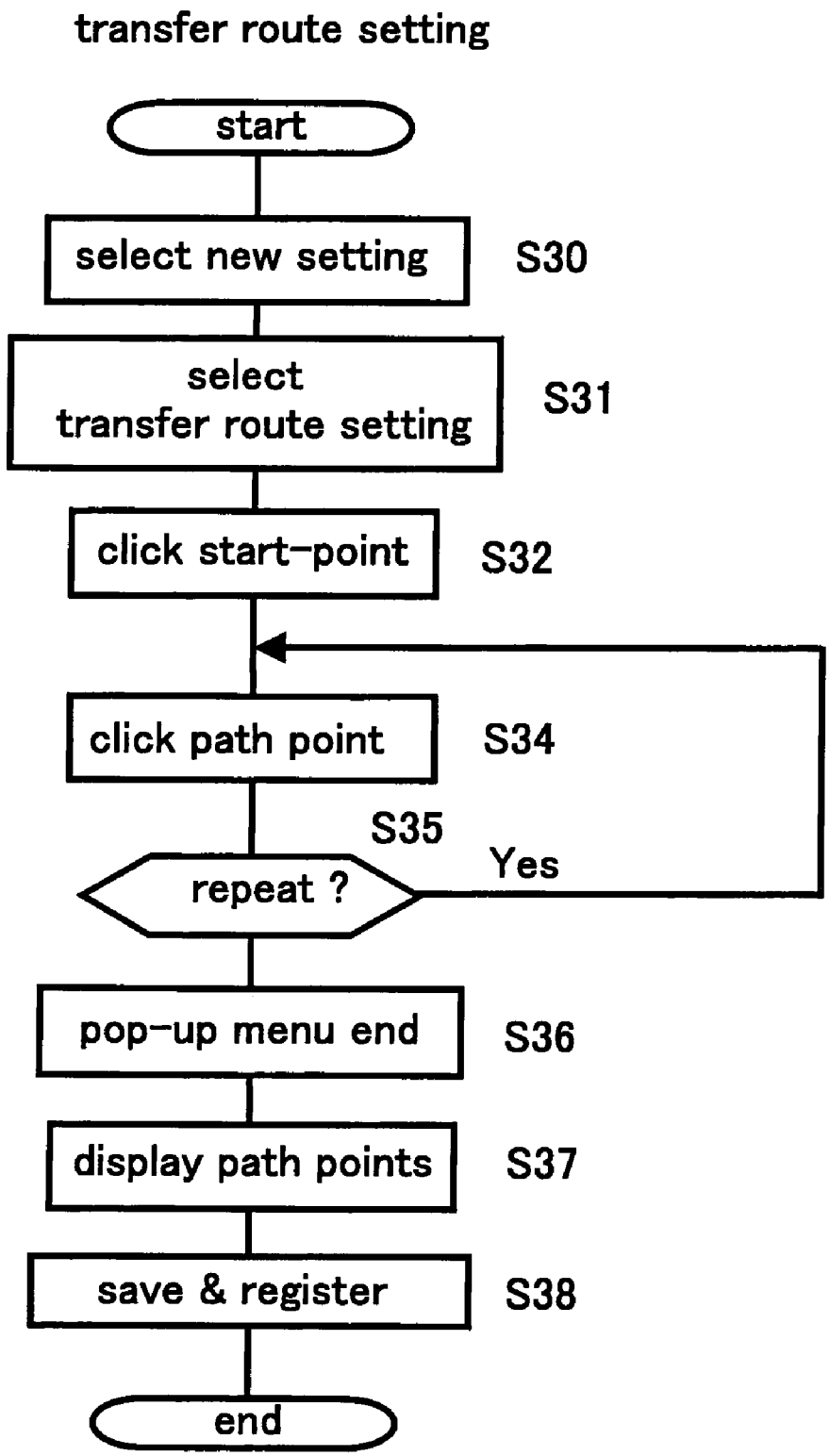
FIG. 7 shows a setting process of path points of a transferred object in the simulation process.

Next, a process is explained referring FIG. 7 by which a transfer route of the object is decided. At first, a file of a menu bar is clicked and a new file is selected (S30). Then in a list window 44, a transfer route setting is clicked (S31), and in a simulation window 40 a starting point of the route is clicked. Further, a path point of an object is designated by a mouse clicking (S34), this process is repeated if it is necessary. After all path points are designated, the process is terminated by a pop-up menu (S36). Rounded path points are displayed (S37), and the route information is saved and registered in the system (S38) and the process is finished. By the process, generating a transfer route of the object is finished, and a preparation of a simulation is concluded.

Figure 8:
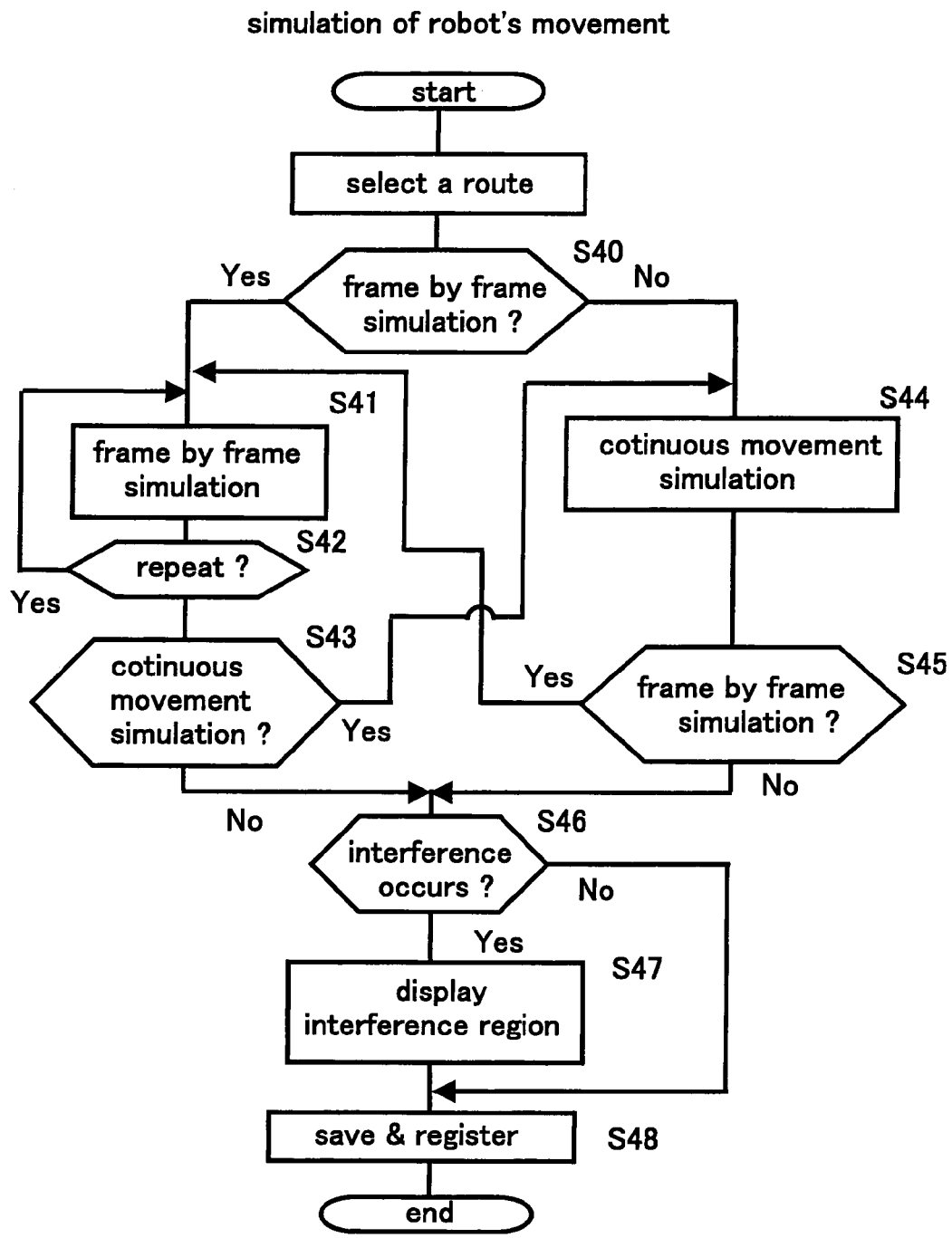
FIG. 8 shows a specific example of the simulation process.

Referring FIG. 8, a process of the simulation is explained. At first, one of routes is selected in a list window 44. Next, when a frame by frame simulation is selected (S40), in which a robot's arm moves a short distance step by step, a frame by frame button 48-2 is clicked. If another frame by frame movement is necessary, then the button 48-2 is clicked again (S42).

If a continuous movement simulation is selected (S43), then a button 48-1 is clicked. The robot simulation device evaluates if the movement of the robot's arm and a wafer 40-3 on the arm cause any interference with working surroundings (S46).

If any interference occurs, the interference region is, for example, displayed (S47) in red in a simulation window in FIG. 3, and the region is saved and registered in the system as a data. When there is no interference, the region is also displayed in the window and saved and registered in the system.

As in the working region, positions (X, Y) in X-Y coordinate axes of the obstacles and the robot's arm are displayed on a screen, it is able to check with eyes if there is any interference region.

In above-mentioned process, when a frame by frame simulation is not selected, a continuous movement simulation (S44) can be selected. When the continuous movement simulation is selected, a frame by frame simulation can be subsequently selected (45).

When the frame by frame simulation is selected, there is a merit that detail of the interference can be monitored and specification of the robot can be modified if it is necessary.

If the continuous movement simulation is selected, there is another merit that a movement of the robot arm and so on can be wholly monitored, for example, a speed of a finger can be evaluated.

Next, if it is confirmed that there is no interference in the simulation, and a movement of the robot has no step-out and it moves smoothly, then a program which makes the robot to work is outputted as a data. In this case, the data can be directly outputted to a control unit of the robot or the program is once stored to a storage media and by the storage media the robot is put into action.

Figure 9:
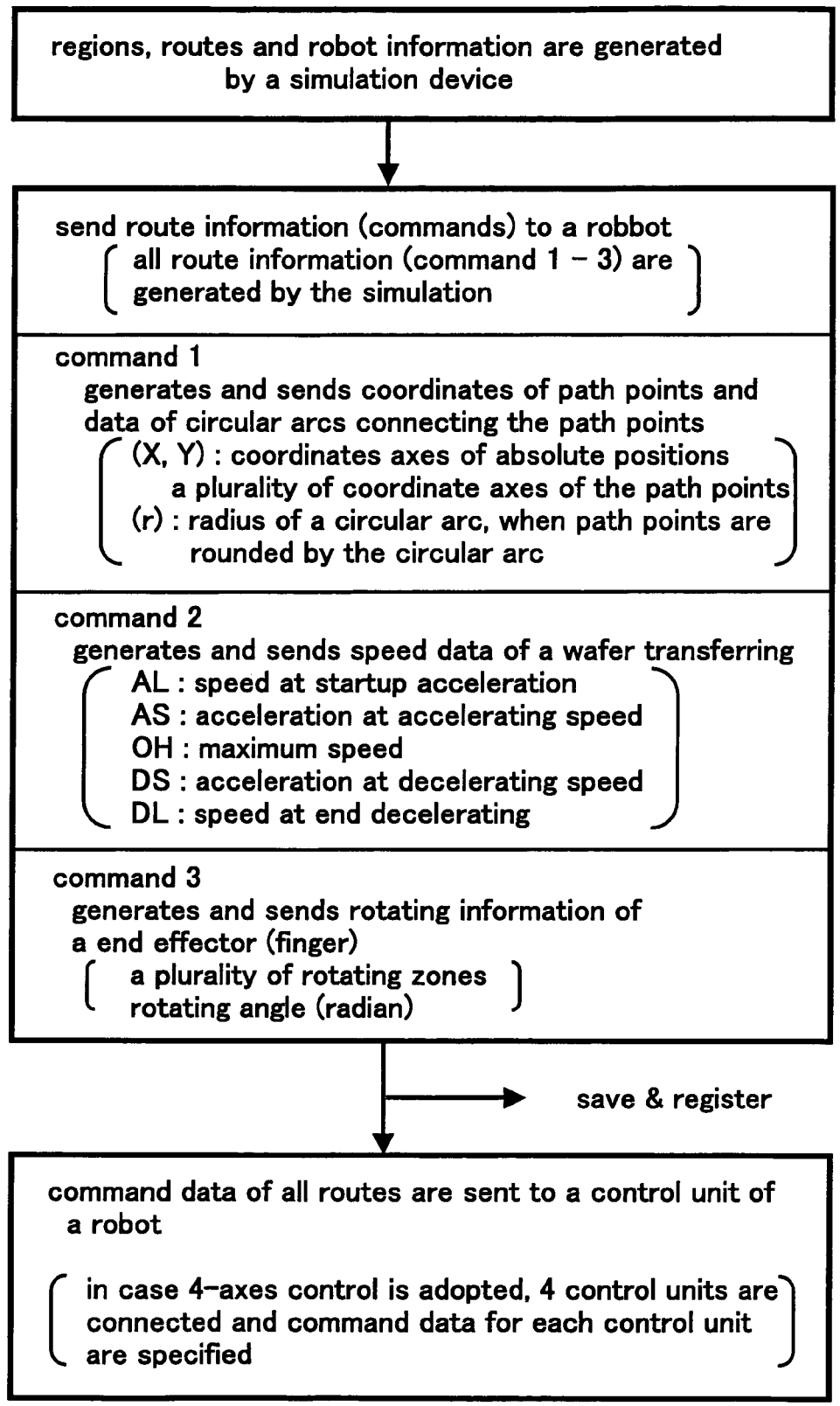
FIG. 9 is a list of commands with which a real robot is actuated.

Referring FIG. 9, contents of the programs by which the robot is activated are explained specifically. Through a process of the simulation, a working space, a path, a position of a robot in X-Y coordinate axes, changes of the position, change speed of the position (a speed), and so forth are inputted to the system. And on the basis of these data, a command 1, 2 and 3 are generated, and by these commands, the robot is put into action.

The command 1 generates coordinates of all positions of a route by connecting lines and circular arcs of the path points of the robot.

The command 2 generates speed of the robot's arm (finger) transferring a wafer (an acceleration at startup, an acceleration at accelerating speed, a maximum speed, an acceleration at decelerating speed, a speed at end decelerating).

The command 3 generates rotating zones and rotating angle of a rotating movement of the robot's arm (finger) transferring a wafer.

Usually, this information is outputted to a storage media which is used by a workstation 12 in FIG. 1. It is available to send the information directly to the workstation. In above-mentioned embodiments, the information is a result of calculation of an interference in a horizontal plane (X-Y coordinate), but similar calculation is possibly done in X-Z coordinate or Y-Z coordinate, as well.

EXPLOITATION IN INDUSTRY

As the robot simulation device of the present invention is able to simulate desirable movements of the robot and its works previously, under a given working space and a specified robot, the robot simulation device is able to set preferable working conditions.

Further, a cheap personal computer can be applied to this robot simulation device, it contributes to reduce an investment in plant and equipment. By the simulation, designing of a working space and an appropriate robot are also available.

It becomes available to make a robot to do a preferable work by programs which are generated by the device. Especially designing a manufacturing equipment of a semiconductor, and manufacturing operation become easy by utilization of the device.

As displays in the system are two dimensional, they match to a floor plan, an elevation view, and a side view, it is easy to design and modify a transferring room and a robot arrangement.

As position data in the device is in μm, precise task teaching to a robot is available. And the teaching is done by a computer, direct handling of the robot's arm is not necessary, thus the device is available to avoid an occurrence of a personal injury.

What is claimed is:

1. A robot simulation device, comprising:
an environment defining ("ED") means for providing a virtual robot working environment in which a virtual robot works in a virtual working space where virtual obstacles are disposed, said virtual robot having a task of transferring a virtual object from a start point to a goal point, said ED means including a path determining means for determining a path of travel of said virtual object associated with said task of said virtual robot by designating via-points between said start point and said goal point; and
a task simulation executing and displaying ("TSED") means responsive to said ED means and said path determining means for executing simulation of said task of said virtual robot and displaying said executed simulation on a display; said TSED means including;
a robot activity region determining and displaying means for determining from said determined path of travel of said virtual object a robot activity region where a moveable portion of said virtual region moves to achieve said task and for displaying said robot activity region on said display; and
an interference region determining and displaying means responsive to said robot activity region for determining whether and where said task is interfered by said virtual obstacles thereby providing an interference region where said task is interfered by said virtual objects and for displaying said interference region on said display;
whereby a desired executed simulation is obtained, in which said virtual robot successfully transfers said virtual object from said start point to said goal point without being interfered by said virtual obstacles.

2. A robot simulation device according to claim 1, further comprising:
a means of measuring and displaying traveling time of said object and said robot, and
a means of displaying a moving picture of said path of said object and said movable portion of said robot.

3. A robot simulation device according to claim 2, further comprising, a means of calculating traveling speed of said object and said movable portion of said robot.

4. A robot simulation device according to claim 1, wherein said display comprises a two-dimensional display which displays a horizontal plane or a vertical plane of said working space.

5. A robot simulation device according to claim 1, wherein said obstacles and said working space are displayed by a polygonal form and/or a circular form.

6. A robot simulation device according to claim 1, wherein said path of said object is calculated by designating a departure point and a destination point of said robot on said display.

7. A robot simulation device according to claim 6, wherein and said path of said object is further calculated by designating a departure point and a plurality of destination points of said object on said display.

8. A robot simulation device according to claim 1, wherein a region where said robot is unable to transfer said object is calculated and displayed by designating a boundary of a movable region of said robot.

9. A robot simulation device according to claim 1, further comprising a teaching data producing ("TDP") means responsive to said TSED means for accepting said desired executed simulation in which said virtual robot successfully transfers said virtual object from said start point to said goal point without being interfered by said virtual obstacles and for producing teaching data based on said desired executed simulation in order that a real robot in the real world corresponding to said virtual robot uses said teaching data to perform a task corresponding to said task in an real working space corresponding to said virtual working space without being interfered by real obstacles corresponding to said virtual obstacles.

10. A robot simulation device according to claim 9, wherein said teaching data is used to direct a motion of a movable part of said real robot.

11. A robot simulation device according to claim 1, wherein said robot is a SCARA type robot and said object is a sheet like plate.

12. A method of robot simulation comprising:
providing a virtual robot working environment in which a virtual robot works in a virtual working space where virtual obstacles are disposed, said virtual robot having a task of transferring a virtual object from a start point to a goal point, including determining a path of travel of said virtual object associated with said task of said virtual robot by designating via-points between said start point and said goal point; and
executing simulation of said task of said virtual robot and displaying said executed simulation on a display, including;
determining from said determined path of travel of said virtual object a robot activity region where a moveable portion of said virtual robot moves to achieve said task, and displaying said robot activity region on said display; and
determining an interference region by determining whether and where said task is interfered by said virtual obstacles, and displaying said interference region on said display,
obtaining a desired executed simulation in which said virtual robot successfully transfers said virtual object from said start point to said goal point without being interfered by said virtual obstacles.

13. The method according to claim 12, further comprising:
measuring and displaying traveling time of said object and said robot, and
displaying a moving picture of said path of said object and said movable portion of said robot.

14. The method according to claim 13, further comprising:
calculating traveling speed of said object and said movable portion of said robot.

15. The method according to claim 12, further comprising:
displaying a horizontal plane or a vertical plane of said working space on said display.

16. The method according to claim 12, further comprising:
displaying said obstacles and said working space by a polygonal form and/or a circular form.

17. The method according to claim 12, further comprising:
calculating said path of said moving object by designating a departure point and a destination point of said robot on said display.

18. The method according to claim 17, further comprising:
calculating said path of said moving object by designating a departure point and a plurality of destination points of said object on said display.

19. The method according to claim 12, further comprising:
calculating and displaying a region where said robot is unable to transfer said object by designating a boundary of a movable region of said robot.

20. The method according to claim 12, further comprising:
accepting said desired executed simulation in which said virtual robot successfully transfers said virtual object from said start point to said goal point without being interfered by said virtual obstacles, and producing teaching data based on said desired executed simulation in order that a real robot in the real world corresponding to said virtual robot uses said teaching data to perform a task corresponding to said task in a real working space corresponding to said virtual working space without being interfered by real obstacles corresponding to said virtual obstacles.

* * * * *